Figure 1:
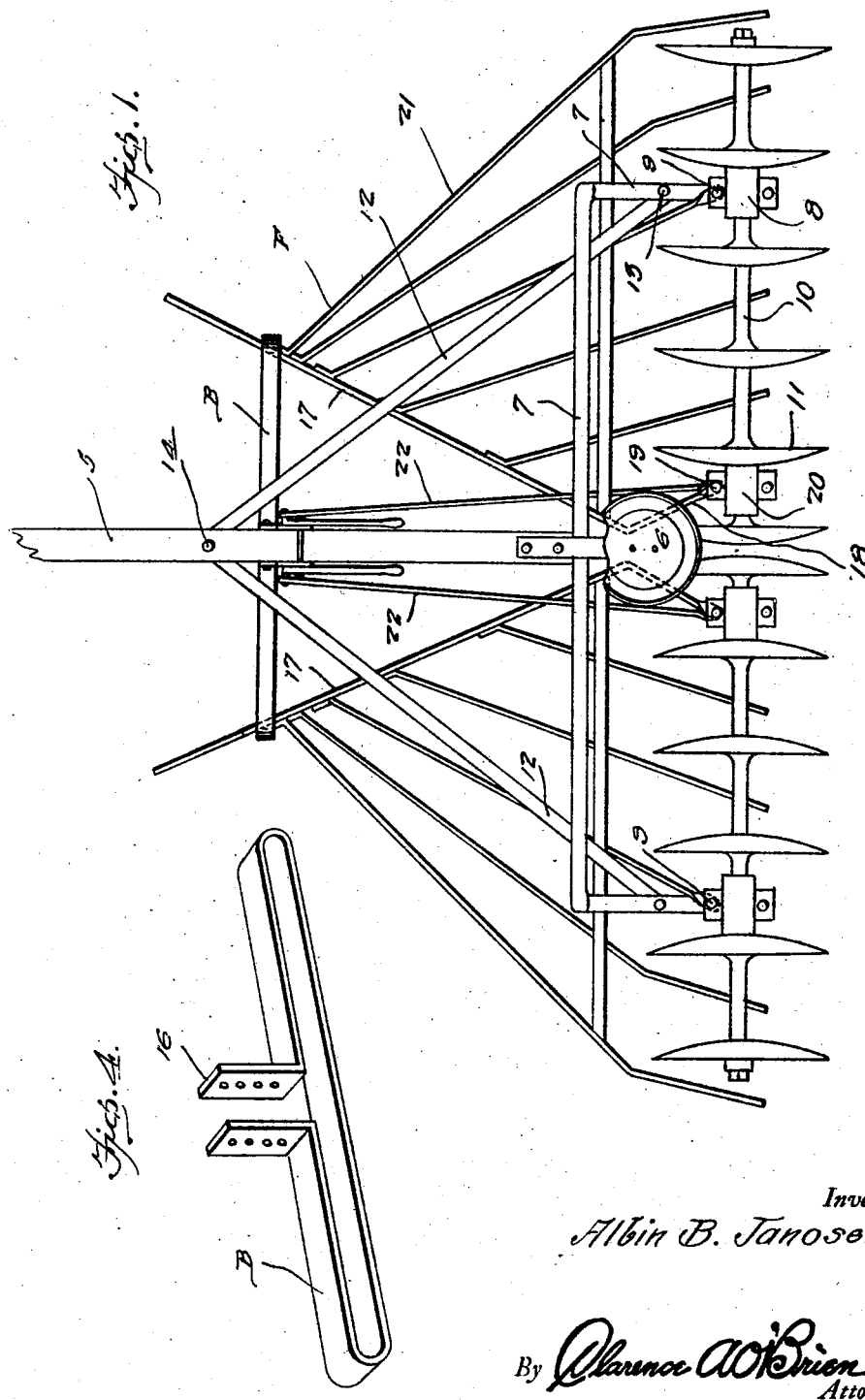

April 19, 1927.

A. B. JANOSEK

HARROW

Filed Jan. 6, 1927  2 Sheets-Sheet 2

1,625,318

Inventor
Albin B. Janosek

By Clarence A. O'Brien
Attorney

Patented Apr. 19, 1927.

1,625,318

UNITED STATES PATENT OFFICE.

ALBIN B. JANOSEK, OF CORPUS CHRISTI, TEXAS.

HARROW.

Application filed January 6, 1927. Serial No. 159,384.

The present invention relates to harrows generally and more particularly to an apparatus for cutting up and turning under the soil, stalks and weeds.

By the use of this improved agricultural implement cotton and other stalks, weeds or grasses may be turned over under the soil and allowed to rot for fertilizing purposes. This device pushes the stalks, weeds or grass to one side, lays it on the ground till the disks roll over it and cut it up and turn it under the soil thereby doing the work of a stalk cutter and soil pulverizer in one operation.

Another very important object of the invention lies in the provision of a device of this nature performing in one operation the double function as mentioned above without requiring any more additional draft than an ordinary disk harrow.

Another important object of the invention lies in the provision of an agricultural implement of this nature which is comparatively simple in its construction, easy to manipulate, thoroughly efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
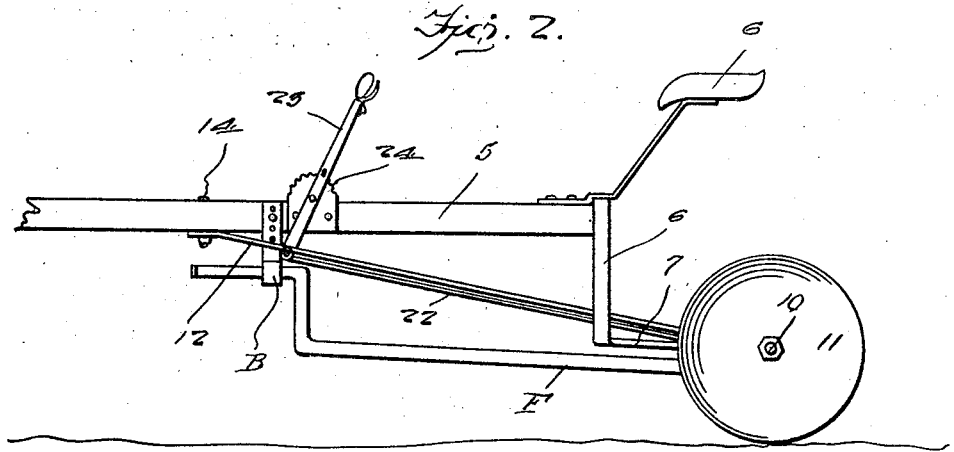
Figure 3:
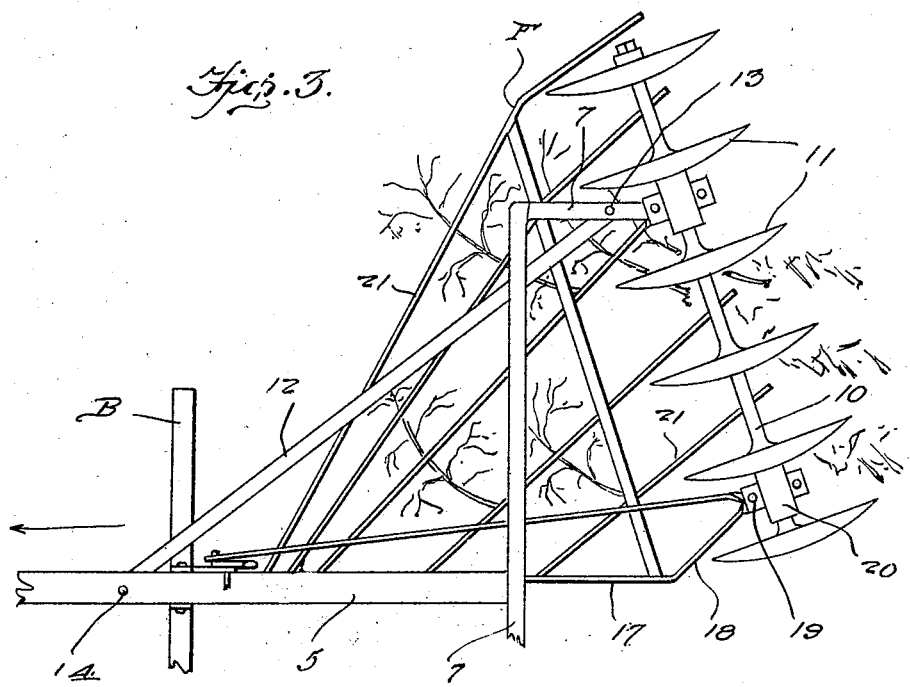

In the drawing:

Figure 1 is a top plan view of the implement embodying the features of my invention, Fig. 2 is a side elevation thereof, Fig. 3 is a fragmentary top plan thereof showing the gang disks adjusted to a different position than that shown in Figure 1, Fig. 4 is a perspective view of a bracket used in the implement.

Referring to the drawing in detail it will be seen that the numeral 5 denotes the main beam which has a seat 6 at the rear end thereof. A cross bar 7 is mounted at its center on the rear end of the beam 5 and the extremities thereof are bent downwardly as at 6 and then rearwardly as at 7. Boxings 8 are pivotally engaged as at 9 with the extremities of the extensions 7 and support axles 10 of the disk gangs 11. The extensions 7 are braced by rods 12 which are engaged therewith as at 13 and are engaged with the beam 5 as at 14. A bracket B includes an oblong loop body having spaced parallel lip terminals 16 straddling the beam 5 a little to the rear of the point 14 and fixed thereto so as to suspend this bracket from the beam to extend transversely thereof. Deflecting frames F are mounted one to each side of the beam 5. Each frame F includes a main bar 17 the forward end of which extends through the bracket B and the rear end of which is bent angularly as at 18 and is pivoted as at 19 with a boxing 20 on shaft 10 at the inner end thereof and deflecting rods 21 extend at various acute angles from the rod 17 rearwardly and outwardly therefrom and one of said rods has its extremities pivoted as at 9 and the outer two rods 21 have their ends slightly bent rearwardly. Links 22 are engaged at 19 and are engaged on levers 23 having associated therewith suitable means 24 for holding the levers in different adjusted positions. Thus when the levers are disposed as shown in Figures 1 and 2, the frames and gangs will be disposed as is shown in Fig. 1 but if the levers are moved forwardly, the links 22 are forced rearwardly thus swinging the gangs 11 and the frames F to angular positions as is shown in Fig. 3. In Fig. 3 the harrow operates to push the stalks and weeds to one side so as to allow the disks to roll thereover and cut them up and turn them under the soil.

It is thought that the construction, operation, and advantages of this invention will now be quite apparent to those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction and in the combination and arrangement of parts may be resorted to without departing from the spirit or scope of the invention as hereinafter claimed or sacrificing any of its advantages.

Having thus described my invention what I claim as new is:

1. A device of the class described including, in combination, a beam, deflecting frames, disk gangs, means for swingably mounting the deflector frames and disk gangs on the beam, and means for operating said frames and said gangs.

2. A device of the class described including a beam, a cross member on the beam, disk gangs, means for pivotally mounting the disk gangs on the extremities of the cross member, deflector frames, means pivotally engaging the deflector frames at the pivots between the gangs and the cross member, means for pivoting the frames at the inner ends of the gangs, means slidably supporting the forward ends of the frames, and means for swinging the gangs to dispose them at different angular positions in relation to the beams.

3. A device of the class described including a beam, a cross member on the beam, disk gangs, means for pivotally mounting the disk gangs on the extremities of the cross member, deflector frames, means pivotally engaging the deflector frames at the pivots between the gangs and the cross member, means for pivoting the frames at the inner ends of the gangs, means slidably supporting the forward ends of the frames, and means for swinging the gangs to dispose them at different angular positions in relation to the beams, each frame comprising a main bar and a plurality of rods projecting acutely therefrom at different angles.

4. An agricultural apparatus of the class described including a beam, a cross member on the beam, a pair of disk gangs, a pair of deflector frames each including a main bar and a plurality of angularly extending deflecting bars, means pivoting the extremities of one of the deflecting bars of each frame and the extremities of the cross member and an intermediate portion of the disk gangs together, means pivoting the extremities of the main bars with the inner end portions of the gangs, and means for swinging the inner ends of the gangs.

5. An agricultural apparatus of the class described including a beam, a cross member on the beam, a pair of disk gangs, a pair of deflector frames each including a main bar and a plurality of angularly extending deflecting bars, means pivoting the extremities of one of the deflecting bars of each frame and the extremities of the cross member and an intermediate portion of the disk gangs together, means pivoting the extremities of the main bars with the inner end portions of the gangs, and means for swinging the inner ends of the gangs, a bracket comprising an elongated loop suspended transversely from the beam, and the forward ends of the main bars being slidable therein.

In testimony whereof I affix my signature.

ALBIN B. JANOSEK.